United States Patent [19]
Lindquist

[11] 3,884,812
[45] May 20, 1975

[54] LIQUID TREATMENT APPARATUS

[75] Inventor: Hans Lindquist, Rotterdam, Netherlands

[73] Assignee: ITT Industries, Inc., New York, N.Y.

[22] Filed: Dec. 13, 1973

[21] Appl. No.: 426,951

[52] U.S. Cl............... 210/220; 261/36 R; 261/122; 261/DIG. 75
[51] Int. Cl............................................. C02c 1/12
[58] Field of Search....... 210/14, 15, 205, 220, 221; 261/36 R, 76, 122, 123, DIG. 75

[56] References Cited
UNITED STATES PATENTS

| | | | |
|---|---|---|---|
| 3,169,921 | 2/1965 | Griffith | 210/15 |
| 3,336,016 | 8/1967 | Schreiber | 210/15 |
| 3,489,396 | 1/1970 | D'Aragon | 210/220 |

FOREIGN PATENTS OR APPLICATIONS

| | | |
|---|---|---|
| 729 | 1/1915 | United Kingdom |

Primary Examiner—Samih N. Zaharna
Assistant Examiner—Peter A. Hruskoci
Attorney, Agent, or Firm—Thomas L. Peterson

[57] ABSTRACT

An apparatus for waste water treatment in which upper and lower horizontally disposed planes, each having the general configuration of an airfoil, are mounted in a ring channel. An aerator is positioned adjacent to the bottom of the channel. The forward portion of the upper plane is disposed in front of the aerator while the entire lower plane is disposed in front of the aerator near the bottom of the channel. The planes cooperate hydrodynamically in such a way that the aerator itself serves to efficiently circulate the water through the channel, as well as aerate the waste sludge in the water.

2 Claims, 3 Drawing Figures

PATENTED MAY 20 1975

3,884,812

LIQUID TREATMENT APPARATUS

BACKGROUND OF THE INVENTION

This invention relates generally to a liquid treatment apparatus and, more particularly, to an apparatus for aerating and circulating water containing waste sludge in a ring channel or the like.

In waste water treatment according to the active sludge method, the water and the active sludge are aerated partly in order to obtain sufficient oxidizing and partly in order to avoid separation between the heavy sludge and the water. If sedimentation of sludge in the aerating tank is to be avoided, the speed of the bottom water must be at least 0.3 m/sec. This can be achieved by turbulent flow or by forming the tank and the aerator so that a directed flow along the bottom is obtained. An example of such a device is called a ring channel.

In a typical ring channel the water is forced to flow in a closed or continuous channel with an oval form, or in a tank which is divided with walls so that a closed channel is formed. Normally the water is circulated by help of rotating brushes, impellers or pumps. These devices, which aerate and drive the water, often cause very small waste water drops to be thrown up into the surrounding atmosphere, which causes sanitary problems. Another problem connected with this method is that the water is cooled down, which has a restrictive influence on the biological process. It is therefore generally desirable to use different air in-blowing methods instead.

In general, air in-blowing in conventional ring channels has been insufficient to circulate the water in the channels, thus requiring impellers or pumps under the water surface for performing this function. This machinery has been relatively expensive, which has had a restrictive influence on the popularity of the ring channel. Therefore, it is desirable to utilize a water circulating channel which does not require such machinery. British Pat. No. 729, issued in 1914, and U.S. Pat. No. 3,336,016 disclose waste water treatment tanks in which aerators are employed to both aerate the sludge and circulate the water through the tank. However, there is no evidence that these devices have been utilized on a practical basis. It is believed that these devices are somewhat inefficient due to their design configurations. It is the object of the present invention to provide an improved waste treatment apparatus which efficiently aerates and circulates the water therethrough without the requirement of expensive machinery.

SUMMARY OF THE INVENTION

According to the principal aspect of the present invention, there is provided an apparatus for circulating and aerating a body of water containing waste sludge for treatment according to the active sludge method. The apparatus includes a continuous channel in which there are mounted upper and lower planes each having the configuration of an airfoil. These planes are mainly horizontally disposed in the channel, the length of the planes being substantially greater than their height. An aerator is mounted near the bottom of the channel for introducing air bubbles into the water in the channel. The upper plane is disposed adjacent to the water level in the channel with a portion thereof positioned above the aerator. The lower plane is mounted adjacent the bottom of the channel immediately in front of the aerator. The two planes cooperate hydrodynamically in such a manner that the aerator itself efficiently circulates water through the channel and simultaneously aerates the sludge contained in the water.

DESCRIPTION OF THE PREFERRED EMBODIMENT

Figure 1:
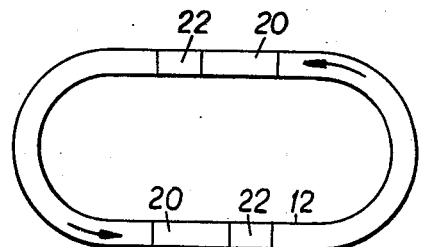
FIG. 1 is a schematic illustration in top plan view of a ring channel embodying the novel features of the present invention.
Figure 2:
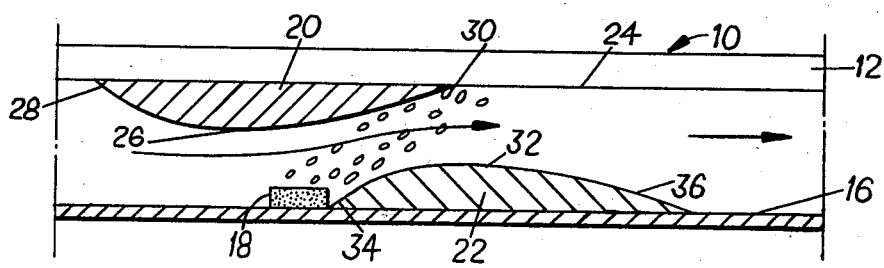
FIG. 2 is a enlarged vertical sectional view, taken lengthwise through a straight section of the ring channel.

Referring now to the drawing in detail, reference numeral 10 generally designates a ring channel, which may be circular or oval in configuration, as shown. The channel includes a pair of side walls 12 and 14 and a bottom 16. An aerator 18 is mounted adjacent the bottom 16 on opposite sides of the channel. This aerator, shown schematically, introduces air bubbles into water circulating through the channel in a manner well known in the art.

A pair of hydrodynamically cooperating planes 20 and 22 are mounted in each side of the ring channel. Each plane has a generally airfoil configuration. The top of the plane 20 is adjacent the water level 24 in the channel 10 and the camber or curved surface 26 of the plane is disposed downwardly. The leading edge 30 of the plane 20 is disposed in front of the aerator 18 and the trailing edge 28 is disposed behind the aerator.

The plane 22 is mounted adjacent to the bottom 16 of the channel in front of the aerator 18 with its camber 32 facing upwardly. The trailing edge 34 of the plane 22 is positioned immediately adjacent to the aerator and below the forward portion of the upper plane. The trailing edge 34 is in front of the trailing edge 28 of plane 20 and behind the leading edge 30. The leading edge 36 of plane 22 is disposed downstream from the aerator.

Figure 3:
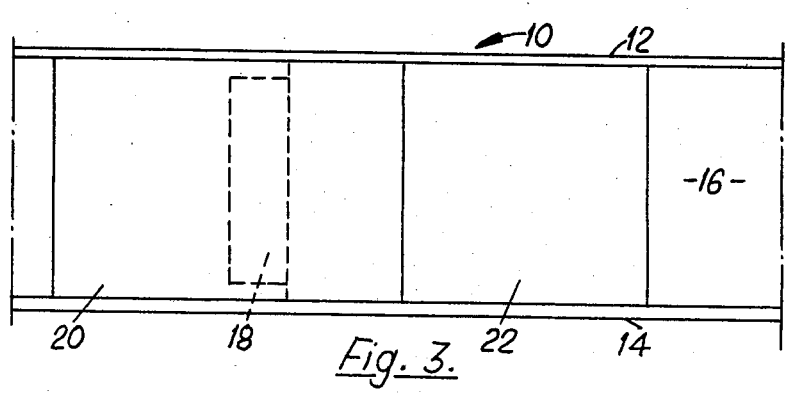
FIG. 3 is an enlarged top plan view of the ring channel section illustrated in FIG. 2.

As best seen in FIG. 3, preferably the planes 20 and 22 extend completely across the channel between the side walls 12 and 14. Also, it is desirable that the aerator 18 extend substantially across the channel.

While two sets of planes and aerators are illustrated in the drawing, it will be appreciated that any number of such sets could be utilized, from one to a substantial number, depending upon the size of the ring channel.

In the apparatus illustrated in the drawing, the plane 20 acts as an accelerator and the plane 22 functions as a diffuser. Water circulating through the channel is forced down against the channel bottom 16 by the plane 20 while accelerating. At the bottom air is blown into the rapidly flowing water by the aerator 18. Because of the air in-blowing the specific gravity of the water is lowered and the speed of the water is further increased, mainly because of a vertical impulse which is transferred to the water by the rising bubbles, but also because of the space which the bubbles take up in the water. Thus, the speed of the water will be increased up to three times the average speed of the channel water. The function of the aerator is to let the air bubbles leave the water mass without losses, that is, without generating whirls, and further to transfer the difference in speed energy between the highest speed and the average speed into potential speed, which is necessary to overcome the friction and the linking resistance in the channel.

In order to understand this hydrodynamic process it is important to realize that in a ring channel the water level is a little higher after a propulsion device than before. These differences in levels correspond to the sum of the energy losses after one turns' flowing in the channel.

In order for the propulsion device of the invention to function properly it is important that the channel depth and the configuration of the planes 20 and 22 be dimensioned in appropriate proportion to each other. That is, the plane 20 must be positioned at the water level 24 with its camber 26 facing downwardly. In addition, the length of the planes should be about 4 to 20 times greater than their height. Also, the height of each plane should be between about one-fourth and three-fourths of the water level of the channel.

The two planes 20 and 22 cooperate in such a way that one is required for the other to perform its function and vice versa. This has been illustrated by employing the features of the present invention in a pilot plant. The plant was arranged for average speed of 0.3 m/sec, after which the plane 20 was removed. The circulating water in the channel stopped almost entirely. The test was repeated but then the plane 22 was removed. Even then the circulation of the water stopped almost entirely.

Tests on the pilot plant with obliquely arranged planes, that is, planes disposed on angle with respect with the bottom of the channel, resulted in a maximum speed being achieved of only 0.1 m/sec. This speed could not be increased by increasing air in-blowing which on the other hand was possible with the original test using both planes of the present invention, where the speed of water circulation was proportional to the quantity of the air blown in within resonable limits. Thus, this test established the necessity of having the planes horizontally disposed in the channel.

Although the invention is particularly adapted for relatively shallow ring channels it is very well suited for deep channels also. The speed increases roughly proportionally to the depth of the channel at a predetermined air quantity per channel depth. This depends on the fact that the air in-blowing, which takes place at the bottom, increases the energy brought by the air porportional to the depth. If the planes 20 and 22 have appropriate proportions, the energy is taken care of with almost no losses. This is very important in big ring channels, where the brush aerators have great difficulty in maintaining the speed of the water high enough at the bottom area of the channels.

What is claimed is:

1. An apparatus for circulating and aerating a body of water containing waste sludge comprising:
    a continuous channel having a bottom and a pair of side walls;
    upper and lower generally airfoil-shaped planes substantially horizontally disposed within said channel perpendicular to said side walls, each of said planes having a leading edge and a trailing edge with a camber therebetween;
    said upper plane being disposed above said channel bottom and said lower plane being disposed adjacent to said channel bottom, with the cambers of said planes facing one another;
    the trailing edge of said lower plane being disposed in front of the trailing edge of said upper plane and below the forward portion of said upper plane;
    means for introducing air into said channel immediately adjacent to said lower plane trailing edge;
    the height of each said plane being within the range of about 1/4 and 3/4 of the distance between said bottom of said channel and the top of said upper plane; and
    the length of each said plane being from about 4 to 20 times greater than the height thereof.

2. An apparatus as set forth in claim 1 wherein: said air introducing means comprises an aerator for admitting small bubbles into said water.

* * * * *